(12) United States Patent
Matsushita et al.

(10) Patent No.: US 7,664,021 B2
(45) Date of Patent: Feb. 16, 2010

(54) RECORDING AND REPRODUCING APPARATUS AND FILE TRANSFER METHOD

(75) Inventors: Ken Matsushita, Tama (JP); Takashi Kokubo, Ome (JP); Koji Kanazawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 638 days.

(21) Appl. No.: 11/289,418

(22) Filed: Nov. 30, 2005

(65) Prior Publication Data

US 2006/0168135 A1 Jul. 27, 2006

(30) Foreign Application Priority Data

Nov. 30, 2004 (JP) ............... 2004-347783

(51) Int. Cl.
*H04L 12/26* (2006.01)
*H04L 9/32* (2006.01)

(52) U.S. Cl. ...................... 370/230; 713/168
(58) Field of Classification Search ........ None
See application file for complete search history.

(56) References Cited

U.S. PATENT DOCUMENTS

| | | | | |
|---|---|---|---|---|
| 7,228,422 | B2 * | 6/2007 | Morioka et al. ............. 713/171 |
| 2004/0098583 | A1 * | 5/2004 | Weber ......................... 713/168 |
| 2004/0133794 | A1 * | 7/2004 | Kocher et al. ................ 713/193 |
| 2004/0141446 | A1 * | 7/2004 | Kamon ..................... 369/53.36 |
| 2004/0250102 | A1 * | 12/2004 | Kim et al. .................... 713/193 |
| 2005/0027788 | A1 * | 2/2005 | Koopmans et al. .......... 709/200 |
| 2005/0027984 | A1 * | 2/2005 | Saito et al. .................. 713/168 |
| 2005/0076063 | A1 * | 4/2005 | Andoh ........................ 707/200 |
| 2005/0160450 | A1 * | 7/2005 | Stephens et al. .............. 725/35 |
| 2006/0161635 | A1 * | 7/2006 | Lamkin et al. .............. 709/217 |
| 2006/0209689 | A1 * | 9/2006 | Nakano et al. ............. 370/230 |
| 2007/0009232 | A1 * | 1/2007 | Muraki et al. ................. 386/95 |

FOREIGN PATENT DOCUMENTS

| | | |
|---|---|---|
| EP | 1 431 859 | 6/2004 |
| JP | 2001-167016 | 6/2001 |
| JP | 2002-203070 | 7/2002 |
| JP | 2002-217894 | 8/2002 |
| JP | 2004-139248 | 5/2004 |
| JP | 2004-199190 | 7/2004 |

* cited by examiner

*Primary Examiner*—Ricky Ngo
*Assistant Examiner*—Clemence Han
(74) *Attorney, Agent, or Firm*—Finnegan, Henderson, Farabow, Garrett & Dunner, L.L.P.

(57) ABSTRACT

A recording and reproducing apparatus includes a file recorder, an interface, and controller which, upon receipt of content file with copy control information, records the content file in the recorder by adding thereto identification information M requesting transfer upon confirmation that a round-trip response time to a destination is not longer than a predetermined time, so that upon receipt of an instruction for transfer of the content file to an external device on the network, the controller determines whether the external device has a function of measuring and determining the round-trip response time to the destination, and in the case where the external device has function of measuring and determining the round-trip response time to the destination, transfers the content file to storage area of the external device, after measuring the round-trip response time and confirming that the measurement is not longer than predetermined time.

18 Claims, 8 Drawing Sheets

RECORDING AND REPRODUCING APPARATUS AND FILE TRANSFER METHOD

CROSS-REFERENCE TO RELATED APPLICATIONS

This application is based upon and claims the benefit of priority from prior Japanese Patent Application No. 2004-347783, filed Nov. 30, 2004, the entire contents of which are incorporated herein by reference.

BACKGROUND OF THE INVENTION

1. Field of the Invention

The present invention relates to a recording and reproducing apparatus for file transfer, and in particular to a recording and reproducing apparatus and a file transfer method using a protocol (i.e. DTCP-IP (Digital Transmission Content Protection-Internet Protocol) Version 1, etc.) which transfers a file upon measurement of a round-trip response time to the apparatus on a network and determination that the time is not longer than a predetermined time length.

2. Description of the Related Art

In recent years, the use and ownership of digital devices have extended so widely that even the digital information such as the broadcast contents has come to be usable easily by being transferred on a home network of digital devices. The permission of the unconditional transfer of the contents, however, would result in the wide distribution on the internet, for example, and would pose the problem that the copyright of the contents cannot be protected. On the other hand, a standard called DTCP (Digital Transmission Content Protection) is available to limit the duplication of the contents to a predetermined degree. Further, the use of DTCP-IP, Version 1.1 and subsequent versions (although it is unknown whether Version 1.1 or subsequent versions are applicable in the future, Version 1.1 and subsequent versions are herein collectively referred to as "Version 1.1, etc.") for transfer on, for example, LAN within a predetermined time by measuring the round-trip response time to the destination can secure the utility of the user while at the same time preventing the limitless distribution of the contents.

Patent Document 1 (Jpn. Pat. Appln. KOKAI Publication No. 2004-199190) discloses a technique for measuring the round-trip response time to the destination to transfer the contents only within a predetermined time on LAN.

In the conventional techniques described above, however, the file transfer to the conventional digital devices of the destination having no limit in the round-trip response time would lead to the subsequent duplication with the limitless round-trip response time, thereby causing inconvenience that the file cannot be transferred to the conventional devices. In that case, the problem is posed that the user holding a conventional device cannot enjoy the digital networking in his home with a built-in home AV network.

BRIEF SUMMARY OF THE INVENTION

A recording and reproducing apparatus according to one embodiment of the present invention comprises: a recorder configured to store a content file; an interface configured to conduct communication with an external device on a network; and a controller configured to, upon receipt of the content file with copy control information, record the content file in the recorder by adding thereto identification information requesting transfer upon confirmation that a round-trip response time to a destination is not longer than a predetermined time, so that upon receipt of an instruction for transfer of the content file to the external device on the network, the controller determines whether the external device has a function of measuring and determining the round-trip response time to the destination, and in the case where the external device has function of measuring and determining the round-trip response time to the destination, transfers the content file to a storage area of the external device, after measuring the round-trip response time to the external device and confirming that the measurement is not longer than a predetermined time.

DETAILED DESCRIPTION OF THE INVENTION

Embodiments of the invention will be described in detail below with reference to the drawings.

Specifically, according to an embodiment of the invention, there is provided a recording and reproducing apparatus having the functions of recording and reproducing a content file, for example, and transferring it to a device on a network through a built-in interface. A specific example is a hard disk recorder described below, or a flat television having a recording area and mounted thereon a digital tuner or the like as shown in FIG. 2. Any other devices that can record, reproduce and transfer digital contents are applicable. The hard disk recorder is explained below as an example with reference to FIG. 1, after which the file transfer function constituting one of the features of this embodiment, in which both the convenience and the copyright protection of the digital devices are secured at the same time, is explained in detail with reference to a flowchart, etc.

<Recording and Reproducing Apparatus According to an Embodiment of the Invention>

(Configuration)

Figure 1:
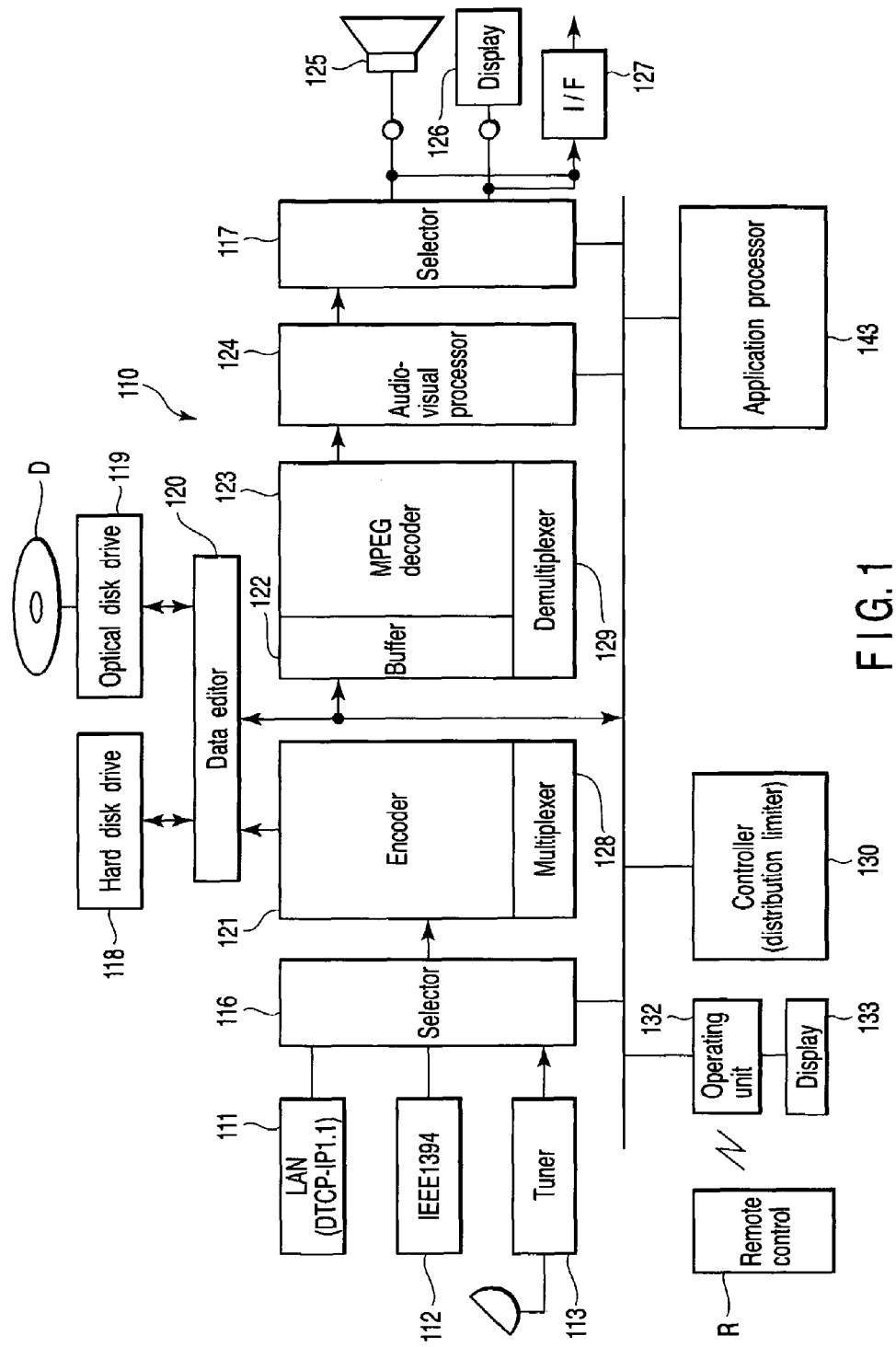
FIG. 1 is a block diagram showing an example of a configuration of a recording and reproducing apparatus according to an embodiment of the invention.
Figure 2:
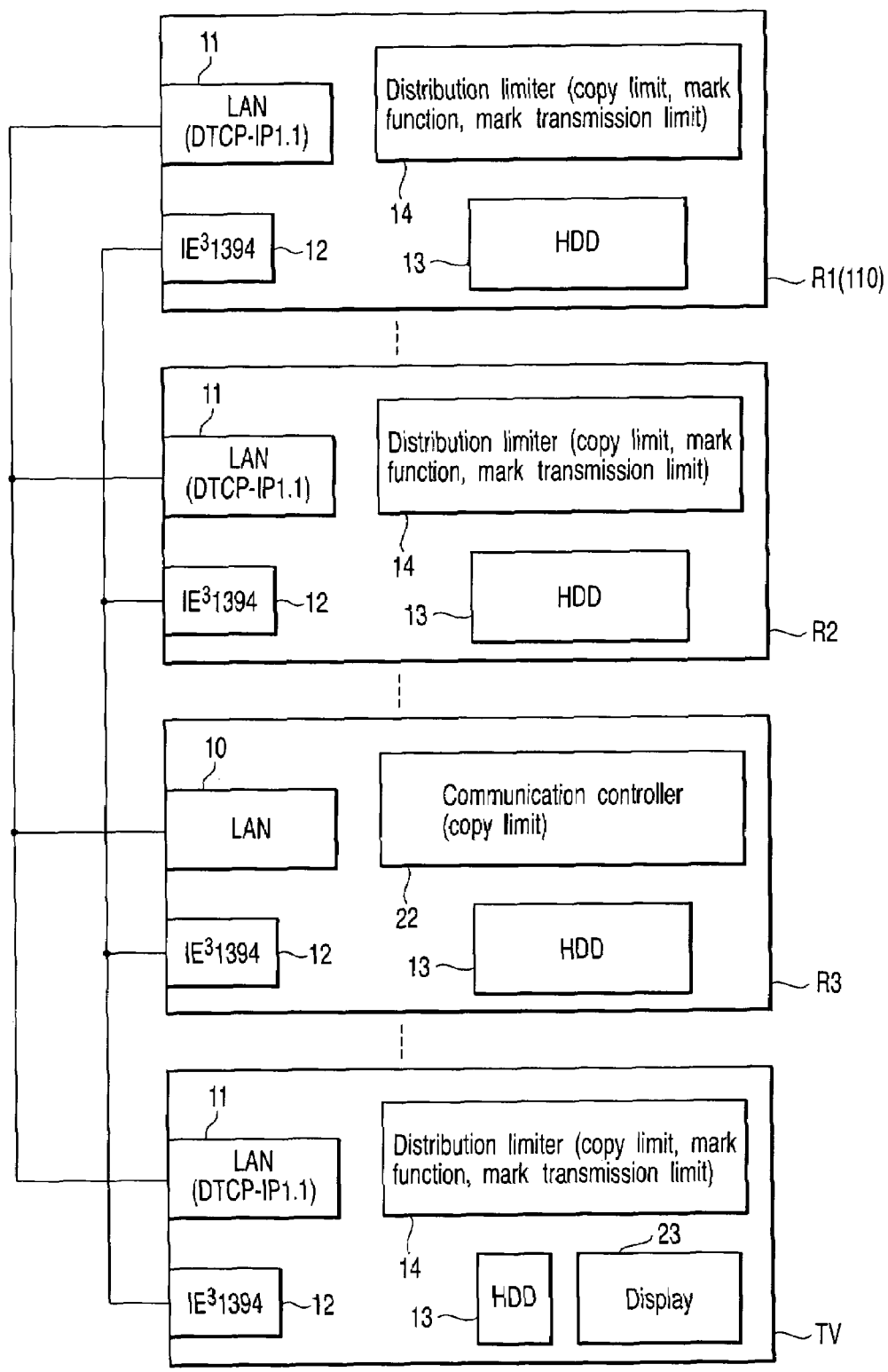
FIG. 2 shows a network diagram showing an example of a network made up of the recording and reproducing apparatus according to the embodiment of the invention.

First, a block diagram representing an example of a configuration of a recording and reproducing apparatus according to an embodiment of the invention is shown in FIG. 1. The recording and reproducing apparatus shown in FIG. 1 has two types of disk drives. One is an optical disk drive 119 for executing the information read/write operation by rotationally driving an optical disk D as a first information recording medium capable of constructing a video file. The other is a hard disk drive 118 for driving a hard disk as a second medium. A controller 130 is connected to the various parts through a data bus to control the overall operation.

The recording and reproducing apparatus shown in FIG. 1 includes, as main component elements, an encoder 121 making up a recording side, an MPEG decoder 123 making up a reproducing side, and the controller 130 for controlling the operation of the apparatus. The recording and reproducing apparatus also has an input-side selector 116 and an output-side selector 117. The input-side selector 116 is connected with a network I/F 111 of LAN (DTCP (Digital Transmission Content Protection)-IP (Internet Protocol) 1.1, etc.), an IEEE1394 interface 112 and a tuner 113 to output a signal to the encoder 121. The recording and reproducing apparatus further has the encoder 121, a data editor 120 for receiving the output of the encoder 121 and editing or otherwise processing the data as desired, the hard disk drive 118 connected to the data editor 120, and the optical disk drive 119. Furthermore, the recording and reproducing apparatus has the hard disk drive 118, the MPEG decoder 123 for receiving and decoding a signal from the optical disk drive 119, the encoder 121, a buffer 122, a multiplexer 128, a demultiplexer 129, the controller 130, a memory 142 and an application processor 143. These parts are connected to the controller 130 through a data bus. The output of the selector 117 is connected to an external speaker 125 and a display 126, or supplied to an external device through an interface 127 for communication with the external device.

Further, the recording and reproducing apparatus has an operating unit 132 connected to the controller 130 through the data bus to receive operations of a user and a remote control R. The remote control makes possible substantially the same operation as the operating unit 132 arranged on the body of the recording and reproducing apparatus. Thus, the record/reproduce instructions can be issued to the hard disk drive 118 and the optical disk drive 119, and the issuance of an edit instruction, the tuner operation, and the various setting including the record reservation are made possible.

(Operation)

Basic Operation

In the recording and reproducing apparatus having this configuration, the reproducing process and the recording process are briefly explained taking an optical disk as an example. The optical disk D rotated at a predetermined speed under the control of the controller 130 is irradiated with the laser light, and the reflected laser light is detected by an optical pickup. Based on this, a detection signal S is output. Based on this detection signal S, an RF signal is generated, so that the data is read and reproduced.

The optical disk recording process is controlled by the controller 130, so that the data supplied through the IEEE1394 interface 112 and the selector 16, for example, is supplied to the encoder 121, where it is encoded and output. In accordance with this coded output and the output of the controller 130, the drive current of a laser driver 165 is supplied to an optical pickup 151, and the laser is radiated on the storage area of the optical disk D thereby to execute the recording process.

Recording Process, etc.

Next, the operation of the recording and reproducing apparatus having this configuration is explained in more detail. First, the record operation is mainly explained in detail with reference to this and other embodiments. The LAN (DTCP-IP1.1, etc.) I/F 111 making up the input side of the recording and reproducing apparatus is connected with an external device and downloads the content information. The tuner 113, which selects and demodulates the broadcast signal through an antenna, is supplied with the video signal and the audio signal. The tuner 113 can handle a great variety of broadcast signals including but not limited to the terrestrial analog broadcast, the terrestrial digital broadcast, the BS analog broadcast, the BS digital broadcast and the CS digital broadcast signals. The tuner is not necessarily single, but two or three or more tuners for the terrestrial analog broadcast, for example, are preferably provided to function suitably in parallel in accordance with the record reservation request.

The IEEE1394 interface 112 can receive the digital contents from an external device on a network. From an input terminal not shown, it can also receive the video signals and the audio signal such as a brightness signal, a color difference signal and a composite signal. These signals are supplied to the selector 116 controlled by the controller 130, so that the input signal is controlled and selectively supplied to the encoder 121. Specifically, the encoder 121 is supplied with the file information from the digital devices on the network through the IEEE1394 interface 112. Also, the external analog video signal and the external analog audio signal are supplied from an input terminal not shown. As an alternative, the analog video signal and the analog audio signal or the digital video signal and the digital audio signal are input through the selector 116 from the TV tuner 113.

The encoder 121 has video and audio analog digital converters, a video encoder and an audio encoder for digitizing the analog video signal and the analog audio signal input from the selector 116. Further, an auxiliary video encoder is included. The output of the encoder 121 is converted to a predetermined compression format such as MPEG and supplied to the controller 130.

In the apparatus shown in FIG. 1, the information (a pack of video, audio, auxiliary video data, etc.) encoded by the encoder 121 and the management information generated are supplied through the controller 130 to the hard disk drive 118 and the optical disk drive 119, and can thus be recorded in the hard disk drive 118 or the optical disk D. Also, the information recorded in the hard disk drive 118 or the optical disk D can be recorded in the optical disk D or the hard disk drive 118 through the controller 130 and the optical disk drive 119.

Editing Process, etc.

The data editor 120 executes the editing process, in which the video objects of a plurality of programs recorded in the hard disk drive 118 or the optical disk D can be partly deleted or connected with the objects of a different program.

At the time of editing or other processes, the execution result of the MPU which should be notified to the user are displayed on the display 133 of the recording and reproducing apparatus or on the display 126 in the form of OSD (on-screen display). Also, the controller 130 has an operating unit 132 for applying the operating signal to operate this device. The operating unit 132 is desirably further configured of a remote control R.

Reproducing Process, etc.

Next, the process of mainly reproducing the recorded information is explained in detail with reference to this and other embodiments. The MPEG decoder 123 has a video processor which appropriately synthesizes the decoded main image with the decoded auxiliary image and outputs the main image superposed with the menu, highlight button, subtitles and other auxiliary images.

The output audio signal of the MPEG decoder 123 is converted into an analog signal by a digital-to-analog converter, not shown, through the selector 117 and supplied to the speaker 125 or to an external device through the I/F 127. The selector 117 is controlled by the select signal from the controller 130. As a result, the selector 117 can directly select the signal passed through the encoder 121 in the case where the digital signal from the TV tuner 113 or the IEEE1394 interface 112 is monitored directly.

The recording and reproducing apparatus according to this embodiment has the aforementioned general functions, and can perform the recording/reproducing processes for many sources with the optical disk D or the hard disk drive 118. Next, the process of limiting the distribution of the content file in this recording and reproducing apparatus is explained in detail below.

<Distribution Limiting Process According to an Embodiment of the Invention>

Figures 3, 4:
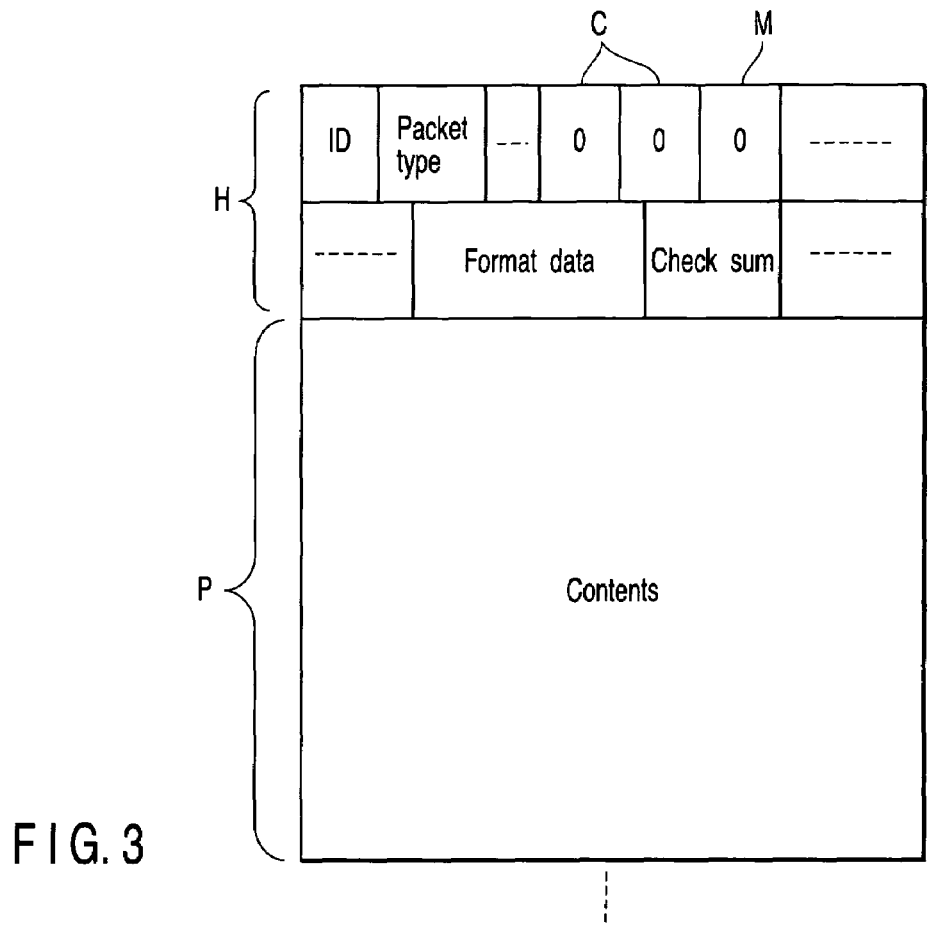
FIG. 3 is a diagram for explaining an example of a content packet handled by the recording and reproducing apparatus according to the embodiment of the invention.
FIG. 4 is a diagram for explaining an example of copy control information of the content packet handled by the recording and reproducing apparatus according to the embodiment of the invention.
Figure 5:
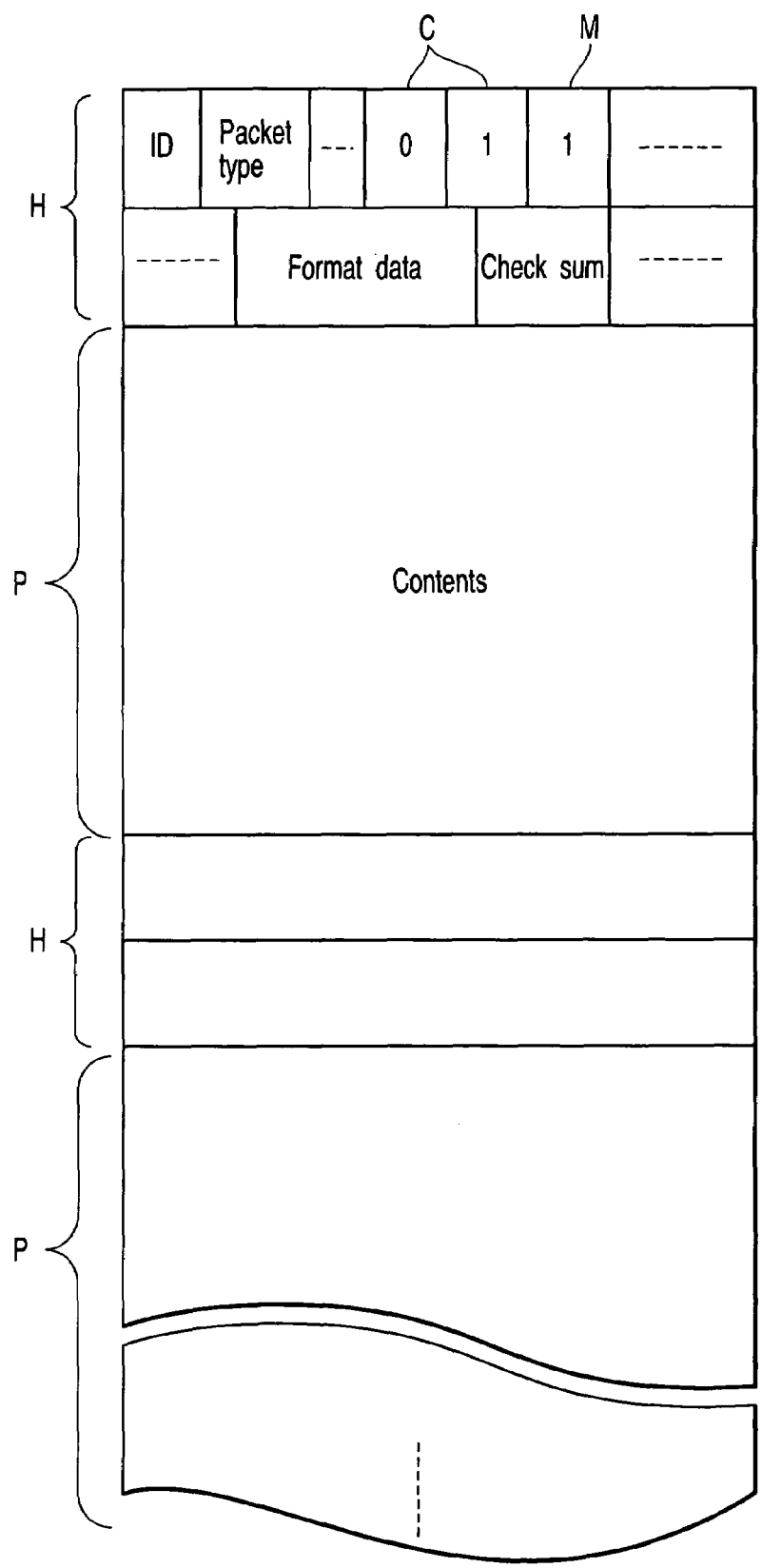
FIG. 5 is a diagram for explaining another example of the content packet handled by the recording and reproducing apparatus according to the embodiment of the invention.
Figure 6:
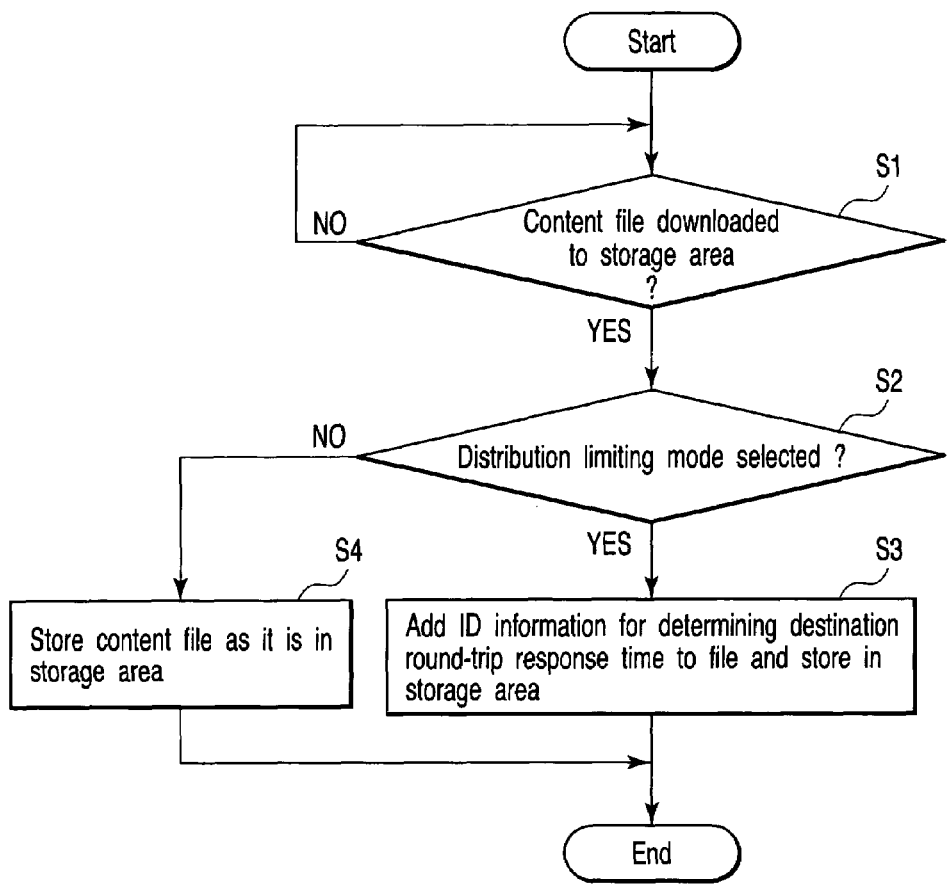
FIG. 6 is a flowchart showing an example of an identification information adding process for limiting the distribution in the recording and reproducing apparatus according to the embodiment of the invention.
Figure 7:
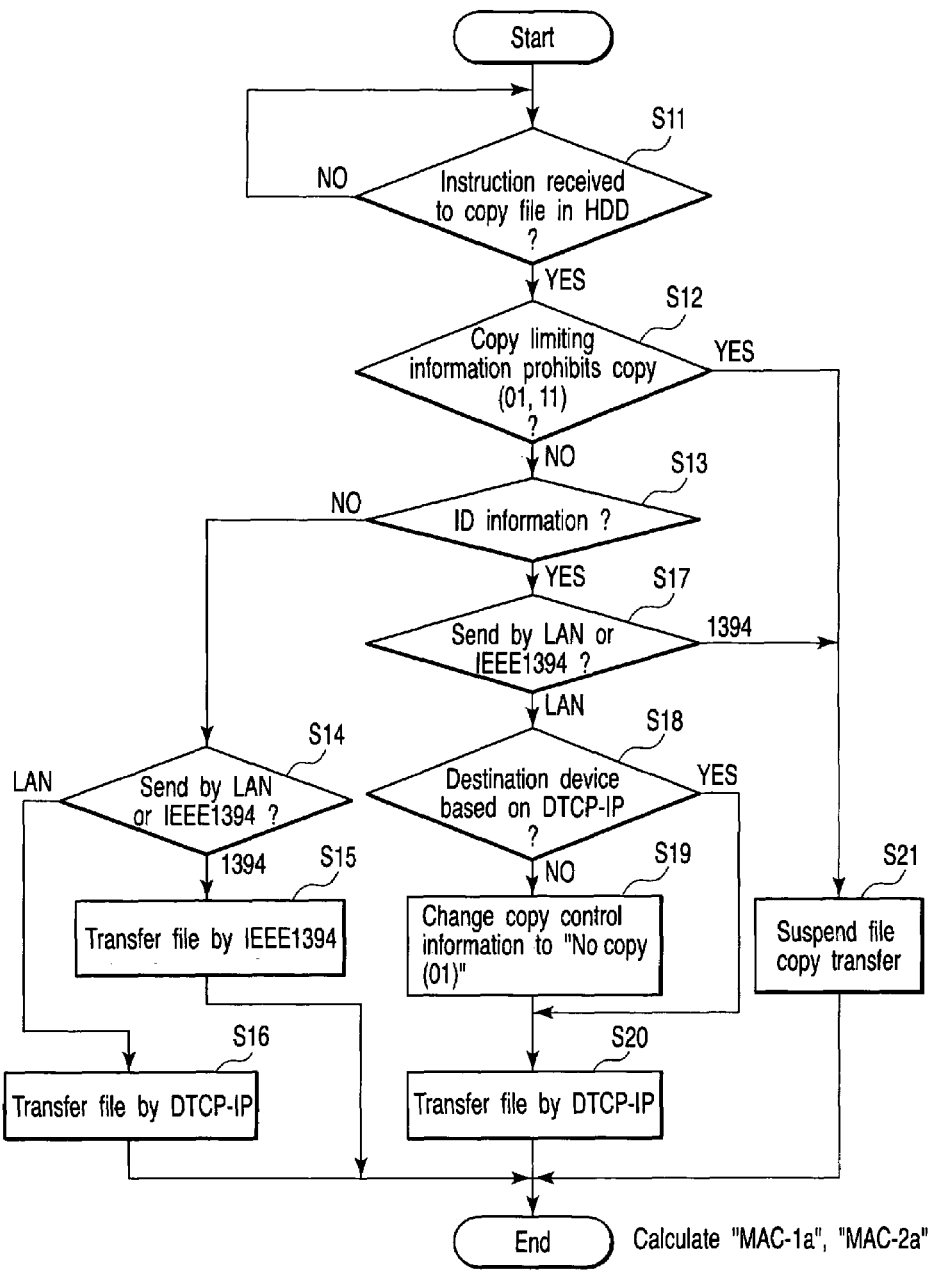
FIG. 7 is a flowchart showing an example of a distribution limiting process in the recording and reproducing apparatus according to the embodiment of the invention.
Figure 8:
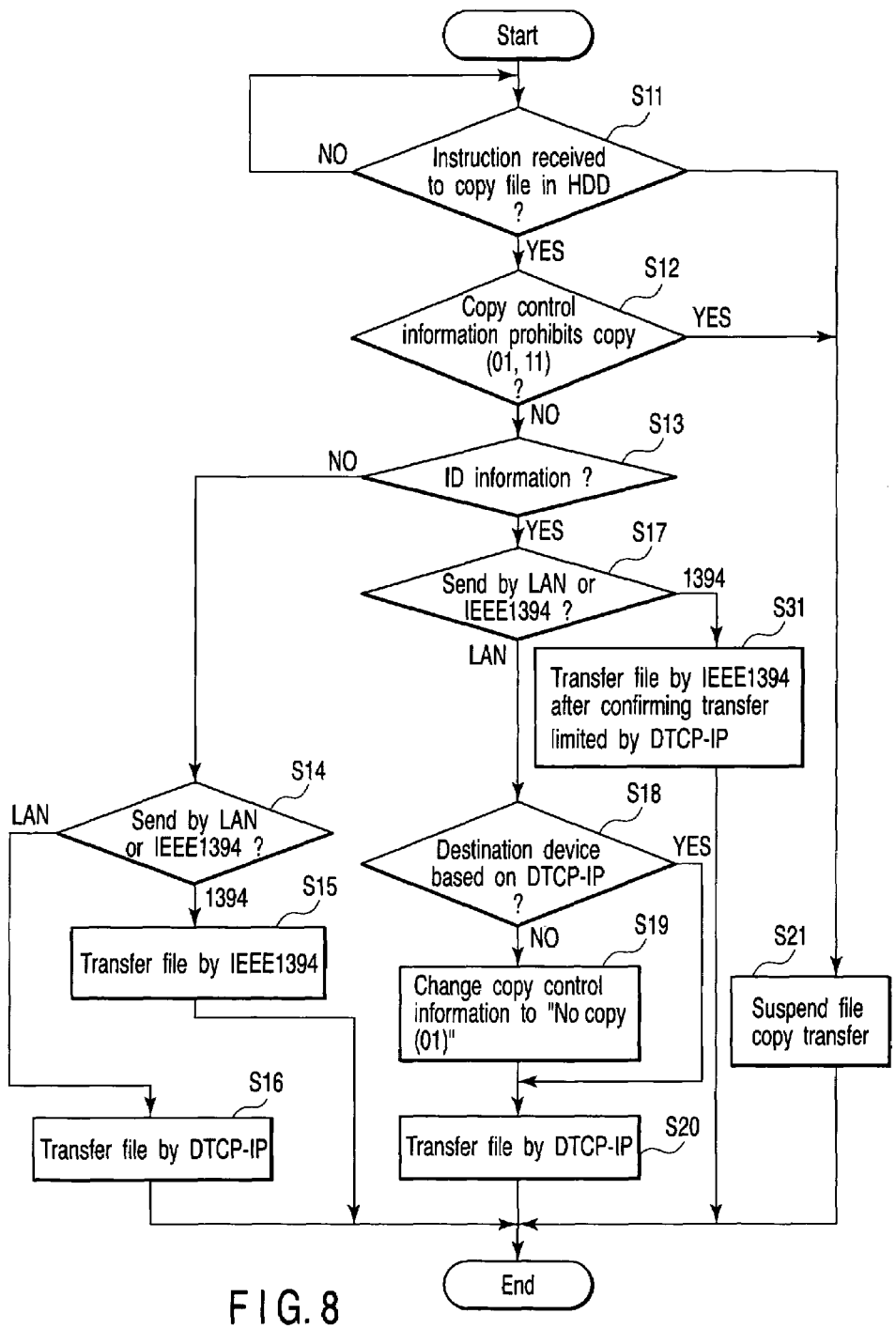
FIG. 8 is a flowchart showing another example of the distribution limiting process in the recording and reproducing apparatus according to the embodiment of the invention.
Figure 9:
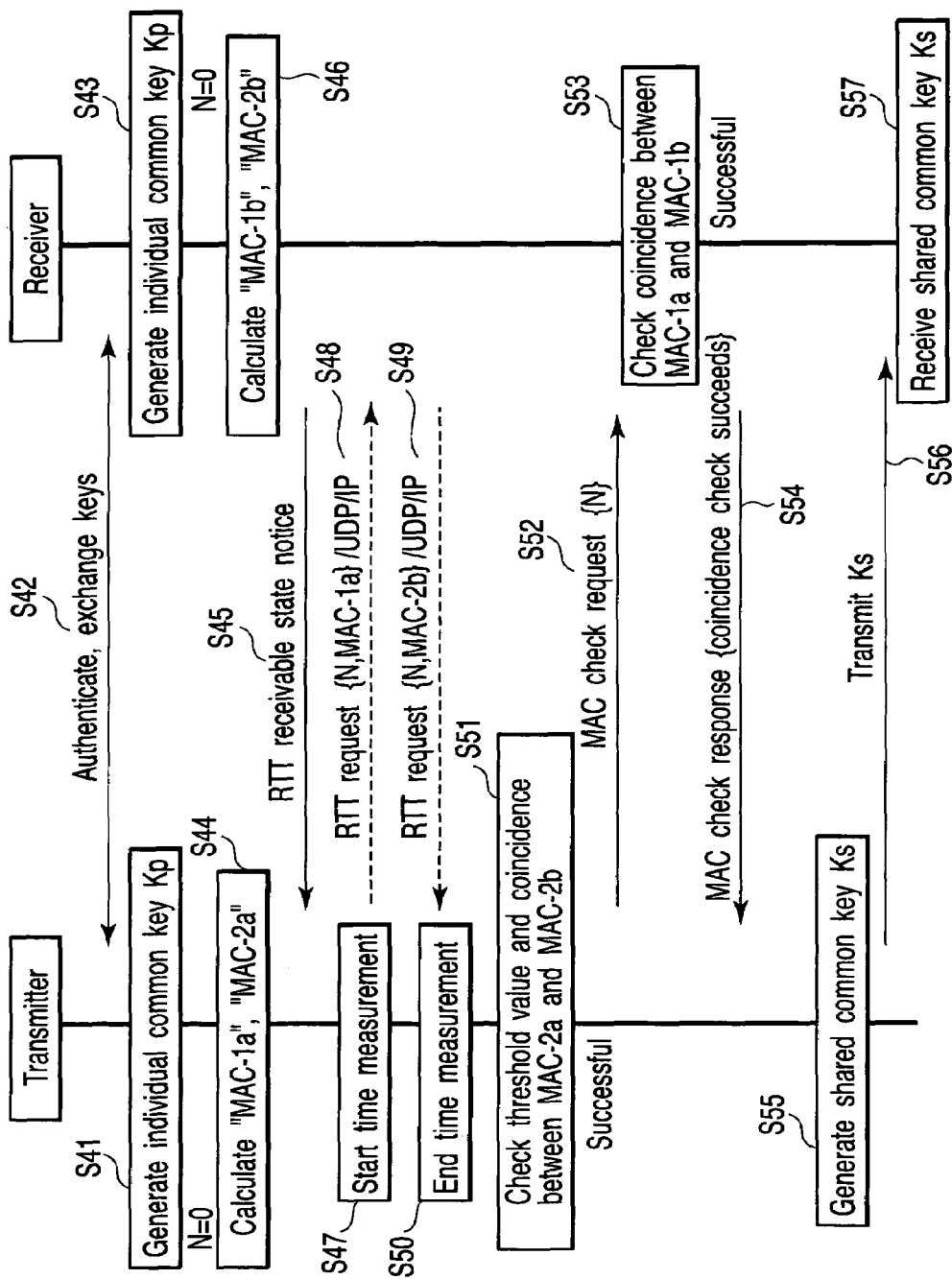
FIG. 9 is a flowchart showing an example of a destination round-trip response time measurement process for the recording and reproducing apparatus according to the embodiment of the invention.

A distribution limiting process according to an embodiment of the invention is explained. FIG. 2 is a network diagram showing an example of the network made up of the recording and reproducing apparatus according to the embodiment of the invention. FIG. 3 is a diagram for explaining an example of a content packet handled by the recording and reproducing apparatus according to the embodiment of the invention. FIG. 4 is a diagram for explaining an example of the copy control information of the content packet handled by the recording and reproducing apparatus according to the embodiment of the invention. FIG. 5 is a diagram for explaining another example of the content packet handled by the recording and reproducing apparatus according to the embodiment of the invention. FIG. 6 is a flowchart showing an example of the identification information adding process for limiting the distribution in the recording and reproducing apparatus according to the embodiment of the invention. FIG. 7 is a flowchart showing an example of the distribution limiting process in the recording and reproducing apparatus according to the embodiment of the invention. FIG. 8 is a flowchart showing another example of the distribution limiting process in the recording and reproducing apparatus according to the embodiment of the invention. FIG. 9 is a flowchart showing an example of the destination round-trip response time measurement process in the recording and reproducing apparatus according to the embodiment of the invention.

First, the distribution limiting process according to the embodiment of the invention has to be understood taking the network configuration into consideration. Specifically, a recording and reproducing apparatus 110 is shown as a recording and reproducing apparatus R1 in FIG. 2. Similarly, a recording and reproducing apparatus R2 uses a LAN 11 operating on DTCP-IP1.1, etc. constituting a protocol to transfer the file upon determination that the measurement of the round-trip response time to a device on the network is not longer than a predetermined time. The television also uses the LAN 11 operating on DTCP-IP1.1, etc.

On the other hand, a recording and reproducing apparatus R3, which uses the conventional LAN and IEEE1394, has no function of transferring the file upon determination that the measurement of the round-trip response time to a device is not longer than a predetermined time.

(Recording Process of Identification Information M)

In the recording and reproducing apparatus 110 connected to a network having the aforementioned network configuration, for example, consider a case in which the terrestrial digital broadcast, the BS digital broadcast or the CS digital broadcast is selected and demodulated by the tuner 113, and the packets of MPEG2TS (transport stream) (or any of the various packets, without any limitation, including MPEG2PS (program stream), MPEG4 or MP3) are recorded by the hard disk drive 118, etc. and downloaded (S1). In the process, the controller (distribution limiter) 130 so functions that the user can arbitrarily determine, by his/her operation, whether the distribution limiting mode unique to this embodiment is selected or not. Assume that the distribution limiting mode is selected on a setting screen not shown (S2).

Specifically, in this case, the content file is configured of a plurality of packets each including a header H and a content data P as shown in FIG. 3. The copy control information C indicates, for example, "Copy free" by 00, "No more copy" by 01, "One more copy" by 10 and "No copy" by 11. This is only an example, and actually any combination of the data and the meaning is possible.

After the copy control information C of the header H in the content file, the condition is inserted to the effect that "the identification information M requesting the transfer after confirmation that the round-trip response time to the destination is not longer than a predetermined time". As an example, preferably, "0" can be determined as invalid, and "1" as valid. For example, "M=1" is set in the form shown in FIG. 5. In this way, the identification information to determine the round-trip response time to the destination can be added to the content file and stored in the storage area such as the hard disk drive 118 (S3).

Further, the identification information M is not necessarily inserted in 1 bit at this position of the header H of the content packet, but can be arranged at a predetermined position in a content stream P. Also, the identification information M is preferably encrypted for each packet or otherwise at the time of transfer. As another alternative, a counter is set at a predetermined number (3, for example), and each time a path (between the 1394 interface and 1394 interface) is followed where the distribution limit described above is not provided, count 1 is decremented. Preferably, no file is distributed to the interface free of distribution limit management when the count reaches "0". As a result, the number of times the redistribution is made using an interface incapable of the distribution limitation management can be limited.

Also, at step S2, the content file is stored as it is in the storage area such as the hard disk drive 118 unless the distribution limit mode is selected by the user (S4).

(Distribution Limiting Process Corresponding to Identification Information M)

The distribution limiting process corresponding to the identification information M executed by the recording and reproducing apparatus 110 is explained in detail with reference to the flowcharts of FIGS. 7 to 9. Assume that the content file recorded in the hard disk drive 118 in accordance with the flowchart of FIG. 6 is instructed by the user operation to transfer from the recording and reproducing apparatus R1 (110) shown in FIG. 2 to an arbitrary device on the network (S11). Upon receipt of this transfer instruction, the controller (distribution limiter) 130 first functions to confirm the value indicated by the copy control information, and determines whether the copy control information (01) or (11) prohibiting the copy is indicated or not (S12). In the case where the copy is so prohibited, the transfer of the content file is suspended (S21).

Unless the copy is prohibited, on the other hand, a predetermined position of the contents file is checked for the presence of the condition "the identification information M requesting the file transfer after confirmation that the round-trip response time to the destination is not longer than a predetermined time" (S13). In the absence of the identification information M, the file is considered free to transfer and it is determined which, LAN or IEEE1394, should be used for transfer. In the case where IEEE1394 is selected, the file is transferred through the IEEE1394 interface 112, for example, to the recording and reproducing apparatus R3 (S15). In the case where LAN is used, on the other hand, the round-trip response time to an external device through the LAN interface 111 is measured in accordance with DTCP-IP1.1, etc. and upon confirmation that not longer than a predetermined time is involved, the file is transferred (S16). The process of confirming the destination round-trip response time is described in detail later with reference to FIG. 9.

In the presence of the identification information M at step S13, it is determined which, LAN or IEEE1394, is to be used for transfer (S17). In the case where IEEE1394 is selected, as an example, the file transfer is suspended for apparent lack of the function to measure the destination response time (S21). If LAN is designated, on the other hand, it is determined whether the destination device is based on DTCP-IP1.1, etc. or not (S18). The device of the destination is so based, the designated content file is transferred to the storage area of the destination device according to DTCP-IP1.1, etc (S20).

In the case where the destination device is not based on DTCP-IP1.1, etc. but simply intended for copy control, i.e. based only on DTCP (Digital Transmission Content Protection, it undesirably may happen that the content file is distributed widely through the internet with the particular device as a loophole after file transfer. Thus, the copy control information is rewritten to, say, "No more copy" (01) or "No copy" (11). In this way, the copyright of the content file is protected before file transfer. The process of confirming the destination round-trip response time is also described later in detail with reference to FIG. 9.

With reference to the flowchart of FIG. 8, another embodiment is explained in which the transfer is not immediately suspended even in the case where the user designates IEEE1394 as a transfer method at step S17. In this embodiment, the destination response time from the destination device is measured according to DTCP-IP1.1, etc., and if the round-trip response time is not longer than a predetermined time, the content file is subsequently transferred using the IEEE1394 interface 112. By doing so, the response time is positively determined with LAN 111 based on DTCP-IP1.1, etc., and once the test proves successful, the transfer process is executed quickly using the IEEE1394 interface 112 considered to have a higher transfer rate.

<Actual Process of Confirming Destination Round-Trip Response Time According to an Embodiment of the Invention>

Next, a specific example of the process for confirming the destination round-trip response time is explained in detail with reference to FIG. 9. FIG. 9 is a sequence diagram showing an example of the process in an AKE/RTT measurement phase executed between a transmitter A and a receiver B. In the AKE/RTT measurement process shown in FIG. 9, the RTT value of the transmitter A and the receiver B is measured for determination.

First, the transmitter A and the receiver B generate individual common keys Kp (S41) and execute the authentication and key exchange process to check whether they are legitimate devices or not (S42), after which the individual common key Kp is shared (S43). In the case where the authentication fails, a predetermined error process is executed and no subsequent process executed. As an alternative, the ability of the transmitter and the receiver to execute the RTT (round trip time) measurement process is checked by the version number of a certificate exchanged during the authentication/key exchange process (S45). Specifically, in the case where the version number described in the certificate is not smaller than a specified version, the authentication/key exchange process is followed by the RTT measurement process. Otherwise, the transmitter generates a shared common key Ks without executing the RTT measurement process, and after encryption with Kp, transmits it to the receiver.

Next, the controller, at the time of measuring the destination round-trip response time, generates and transmits the message authentication code by encryption of a generated random number, and measures the round-trip response time based on the time before a response arrives. Specifically, the receiver and the transmitter each generate the message authentication code (MAC) using the initial value, the random number and the individual common key Kp (S44, S46). As shown in the equations below, MAC is configured of the most significant X bits and the least significant Y bits of all the values of the initial value N and the random numbers Ra, Rb encrypted with the individual common key Kp.

MAC-1a=MAC1b=Encryption (Kp, Ra∥Rb∥N) most significant X bits

MAC-2a=MAC2b=Encryption (Kp, Ra∥Rb∥N) least significant Y bits where the values used for authentication/key exchange may be used as the random numbers Ra, Rb.

Alternatively, the random numbers Ra, Rb are generated by the transmitter and the receiver, respectively, before MAC generation and exchanged by transmission to each other in plain texts. Also, N is the initial value shared by the transmitter and the receiver, and hereinafter referred to as the sequence number. A well-known method such as AES can be used as an encryption algorithms for encrypting the initial value N and the random numbers Ra, Rb. In the case where the bit length of MAC-1 and MAC-2 requires a longer value than the encryption block, the well-known mode such as CBS can be used to form a chain of blocks.

Next, an RTT receivable state notice of the successful MAC computation process is transmitted by the receiver to the transmitter (S45). The transmitter that has received this state notice transmits by inserting the MAC-1a calculated earlier with the sequence number N into the RTT request (S48). At the same time, the RTT time measurement is started (S47). The receiver that has received the RTT request inserts MAC-2a corresponding to the sequence number N received as a response into the RTT response and sends it back to the transmitter.

The transmitter, upon receipt of the RTT response (S49), measures the time elapsed after transmission of the RTT request (S50). In the case where this measurement is not longer than a predetermined threshold value, the transmitter checks whether MAC-2a received in the RTT response is coincident with MAC-2b measured in the transmitter (S51). In the case where the checking process is successful, a message notifying the sequence number (N) of the coincident MAC is transmitted to the receiver (MAC check request) (S52). The receiver that has received this message checks whether MAC-1a contained in the data field of the RTT request is coincident with MAC-1b calculated earlier (S53). In the case where they are so coincident, a message notifying the coincidence is sent (S54).

Finally, the transmitter generates a shared common key Ks (S55), and after encryption with Kp, transmits it to the receiver (S56), which in turn receives the shared common key Ks (S57).

The receiver is required to immediately send the RTT response upon receipt of the RTT request from the transmitter. In the case where the receiver receives the RTT request during execution of the MAC calculation process, the time required before sending the response under the calculation load is considered to be longer than otherwise. To avoid this situation, the receiver desirably executes the MAC measurement process in advance. The receiver thus transmits the RTT receivable state notice to notify the transmitter that the receiver is ready to respond immediately to the RTT request.

The RTT request and the RTT response use UDP, and the receiver is required to notify the transmitter of the destination port number at which the receiver can receive the RTT request. This requirement can be met by any one of three methods including (1) a method in which the transmitter and the receiver share a predetermined value set forth in a specification or the like in advance, (2) a method in which the transmitter is notified in the RTT receivable state notice, and (3) a method in which the command for notification of the UDP port number from the receiver to the transmitter is defined, and the receiver notifies the transmitter with the command before sending the RTT request.

It will thus be understood from the foregoing description that in the recording and reproducing apparatus according to the invention, the interface thereof measures the round-trip response time to an external device and after confirming that it is not longer than a predetermined time, transfers the file to the storage of the external device. Also, in the case where the destination device has no function of measuring and determining the round-trip response time to the destination, the copy control information is rewritten to "Copy free" (00), "Copy once" (10), "No more copy" (01) or "No copy" (11). Thus, it is possible to avoid the file being limitlessly distributed from the destination device through the internet or the like. After eliminating the file copy function in this way, the file is transferred to the existing devices. Even the existing devices of the user which have no function of limiting the round-trip response time to the destination, therefore, can be used by being incorporated in the home digital networking system. As a result, the utility of the digital devices can be secured while at the same time protecting the copyright of the digital contents.

The invention can be implemented by those skilled in the art from the various embodiments described above. Further, it is easy for those skilled in the art to conceive various modifications of these embodiments, and the invention is applicable to various embodiments without any inventive capabilities. The present invention, therefore, covers a wide range of applications not in conflict with the principle and the novel features disclosed herein, and is not limited to the embodiments described above.

What is claimed is:

1. A recording and reproducing apparatus comprising:
   a recorder configured to store a content file;
   an interface configured to conduct communication with an external device on a network; and
   a controller configured to:
      upon receipt of the content file with copy control information, record the content file in the recorder by adding thereto identification information requesting transfer upon determination that a round-trip response time to a destination is not longer than a predetermined time;
      upon receipt of an instruction for transfer of the content file to the external device, determine whether the external device has a capability to determine a round-trip response time;
      when the external device has no function of measuring and determining a round-trip response time, rewrite the copy control information to "No copy"; and
      if the external device has the capability, transfer the content file to a storage area of the external device, after determining that a round-trip response time to the external device is not longer than the predetermined time.

2. The recording and reproducing apparatus according to claim 1, further comprising a tuner configured to receive a broadcast signal and demodulate the broadcast signal into audio-visual information thereby to generate the content file.

3. The recording and reproducing apparatus according to claim 1, wherein
   the interface has an interface for the IEEE1394 network and an interface for LAN having the function of measuring round-trip response time, and
   if the content file has the identification information, the file transfer through the IEEE1394 interface is prohibited regardless of a transfer instruction applied thereto.

4. The recording and reproducing apparatus according to claim 1, wherein
   the interface has an interface for the IEEE1394 network and an interface for LAN having function of measuring round-trip response time, and
   the controller, upon receipt of an instruction to transfer the content file having the identification information through the IEEE1394 to the external device,
   measures the round-trip response time to the external device by the LAN, and
   transfers the content file to the external device through the IEEE1394 if the round-trip response time to the external device is not longer than the predetermined time.

5. The recording and reproducing apparatus according to claim 1, wherein the content file to be controlled by the controller includes MPEG2TS (Moving Picture Experts Group 2 Transport Stream).

6. The recording and reproducing apparatus according to claim 1, wherein the content file to be controlled by the controller includes MPEG2PS (Moving Picture Experts Group 2 Program Stream).

7. The recording and reproducing apparatus according to claim 1, wherein
   the controller measures the round-trip response to the external device time after authentication and exchanging key information with the external device.

8. The recording and reproducing apparatus according to claim 1, wherein
the controller measures the round-trip response time to the external device while, at the same time, determining, by a certificate version for authentication, whether the external device has the function of measuring the round-trip response time.

9. The recording and reproducing apparatus according to claim 1, wherein
the controller measures the round-trip response time to the external device while, at the same time,
generating and transmitting a message authentication code encrypted from a generated random number, and measuring the time before response as the round-trip response time.

10. A file transfer method in which a content file is transferred to an external device on a network in a recording and reproducing apparatus having a recording area and an interface, the method comprising:
receiving the content file with copy control information;
adding identification information requesting transfer after determination that a round-trip response time to a destination is not longer than a predetermined time;
recording the content file in the recording area;
determining, upon receipt of an instruction to transfer the content file to the external device on the network, whether the external device has a capability to determine a round-trip response time;
when the external device has no function of measuring and determining a round-trip response time, rewriting the copy control information to "No copy"; and
if the external device has the capability, transferring the content file to a storage area of the external device, after determining that a round-trip response time to the external device is not longer than the predetermined time.

11. The file transfer method according to claim 10, further comprising:
receiving a broadcast signal using a tuner;
demodulating the broadcast signal into audio-visual information; and
generating the content file from the audio-visual information.

12. The file transfer method according to claim 10, wherein
the interface has an interface for the IEEE1394 network and an interface for LAN having the function of measuring round-trip response time; and
if the content file includes the identification information, the file transfer through the IEEE1394 interface is prohibited regardless of an applied transfer instruction.

13. The file transfer method according to claim 10, wherein
the interface includes an interface for the IEEE1394 network and an interface for LAN having a function of measuring a round-trip response time; and
if the content file includes the identification information, upon receipt of an instruction to transfer; and
upon determination that the round-trip response time to the external device, as measured by the LAN, is not longer than the predetermined time;
the content file is transferred to the external device through the IEEE1394.

14. The file transfer method according to claim 10, wherein the content file to be controlled includes MPEG2TS (Moving Picture Experts Group 2 Transport Stream).

15. The file transfer method according to claim 10, wherein the content file to be controlled includes MPEG2PS (Moving Picture Experts Group 2 Program Stream).

16. The file transfer method according to claim 10, wherein the external device round-trip response time is measured after authentication and exchanging key information with the external device.

17. The file transfer method according to claim 10, wherein
the destination round-trip response time is measured while at the same time determining, by a certificate version for authentication, whether the external device has a function of measuring the round-trip response time.

18. The file transfer method according to claim 10, wherein
the external device round-trip response time is measured while at the same time generating and transmitting a message authentication code encrypted from a generated random number and measuring the time before response as the round-trip response time.

* * * * *